June 11, 1935.  J. W. FITZ GERALD  2,004,431
CLUTCH MECHANISM FOR ENGINE STARTERS
Filed Feb. 13, 1932  3 Sheets-Sheet 1
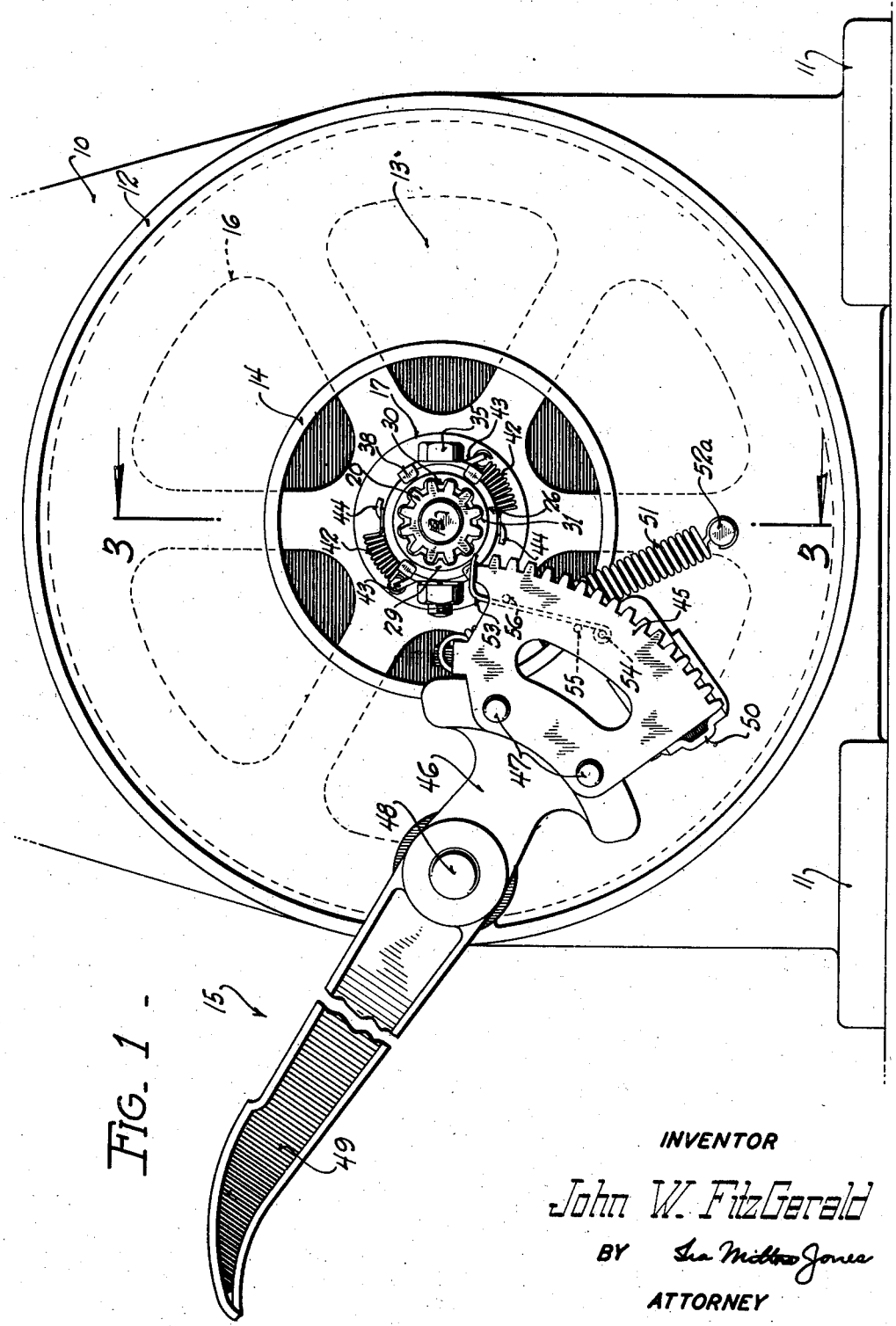
FIG. 1 -
INVENTOR
John W. FitzGerald
BY Ira Milton Jones
ATTORNEY June 11, 1935.　　　J. W. FITZ GERALD　　　2,004,431
CLUTCH MECHANISM FOR ENGINE STARTERS
Filed Feb. 13, 1932　　3 Sheets-Sheet 2
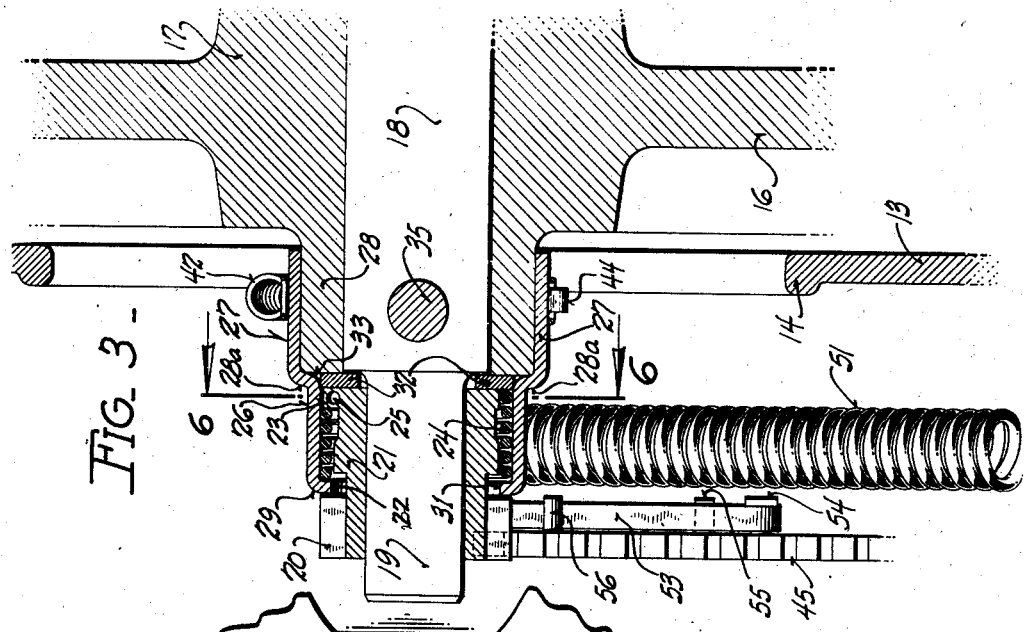
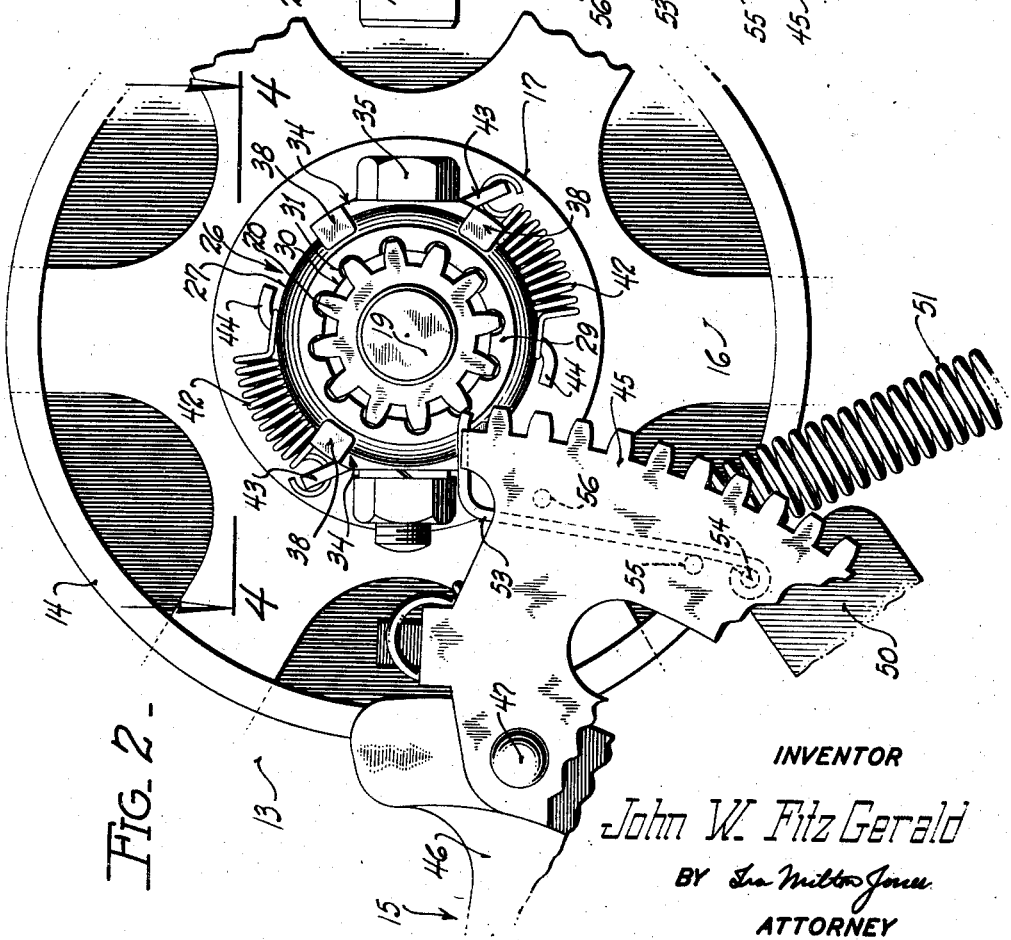
INVENTOR
John W. Fitz Gerald
BY Ira Milton Jones
ATTORNEY

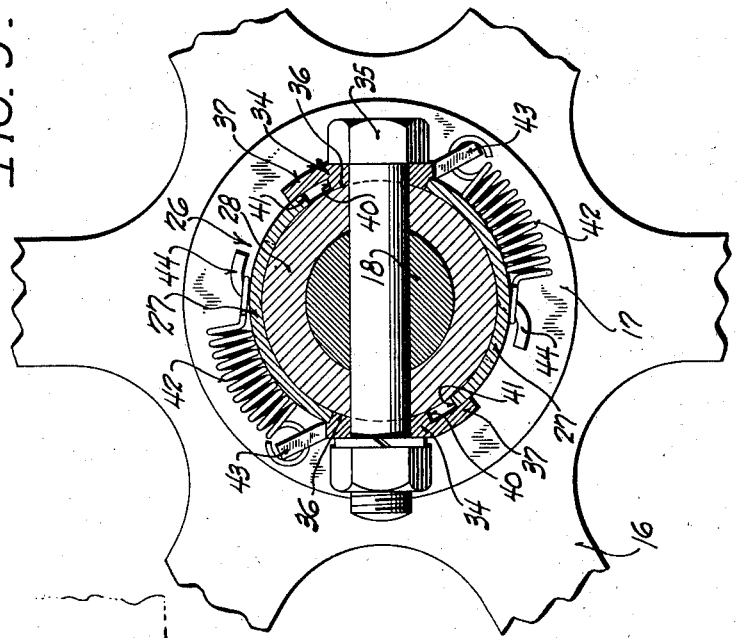

Patented June 11, 1935

2,004,431

UNITED STATES PATENT OFFICE

2,004,431

CLUTCH MECHANISM FOR ENGINE STARTERS

John W. Fitz Gerald, Milwaukee, Wis., assignor to Briggs & Stratton Corporation, Milwaukee, Wis., a corporation of Delaware Application February 13, 1932, Serial No. 592,775

3 Claims. (Cl. 192—42)

This invention relates to engine starters and more particularly to clutch mechanism for engine starters to be used in connection with small stationary engines employed in house lighting systems, but it is to be understood that the invention may be applied to any engine desired.

It is an object of the present invention to provide a releasable clutch between the driven member of the engine starter and the engine to enable the driving member of the starter to return to starting position with the engine running.

A structure embodying the invention is illustrated in the accompanying drawings and will be hereinafter fully described, the invention residing in certain novel features which will be particularly pointed out in the appended claims.

In the drawings:

Figure 1 is an elevational view of the engine starter as installed on a small stationary engine;

Figure 2 is an enlarged view of Fig. 1, showing the details of the starting mechanism;

Figure 3 is a cross section taken on the line 3—3 of Fig. 1, looking in the direction of the arrows;

Figure 4 is a top view of the starter taken on the line 4—4 of Fig. 2, and looking in the direction of the arrows;

Figure 5 is a cross section on the line 5—5 of Fig. 4, looking in the direction of the arrows; and Figure 6 is a detail of the spring clutch mechanism, being a cross section on the line 6—6 of Fig. 3.

Referring to the accompanying drawings in which like numerals indicate like parts throughout the several views, an engine 10 may be mounted on a base 11 and have a fly wheel casing 12 with a circular wall 13, having an aperture 14 therein, the circular wall being remote from the engine and mounting a starter, generally designated 15. The housing 12 encloses a fly wheel 16 having a hub 17 thereof mounted on a shaft 18, the shaft 18 having an extension 19 of reduced diameter at the outer end thereof.

A pinion 20, forming the driving member of the clutch mechanism is mounted on the extension 19 of the shaft 18 and is formed integrally on a hub 21 extending rearwardly from the pinion. The hub 21 has a diameter slightly greater than the minimum diameter of the gear 20 and is provided with a groove 22 extending throughout the circumference between the gear and the main portion of the hub. A lug 23 is formed on the inner end of the hub and extends radially past the outer surface of the hub.

A spring 24 is mounted about the hub 21 and has one end thereof fixed in a socket 25 in the lug 23. The spring is enclosed in a housing 26 where it is in constant frictional engagement with the inner cylindrical wall of the housing. The spring, which has one end fixed to the lug 23 and is in frictional contact with the housing 26, has the other end thereof free so that by turning the gear 20 in one direction, the lug presses against the spring, tending to tighten the frictional engagement against the side of the housing 26, whereas relative rotation between the gear 20 and the housing 26 in the opposite direction tends to loosen the spring from its frictional engagement with the housing 26 to permit free rotation of the gear relative to the housing.

The housing 26 has a pair of arcuate arms 27 which have a greater diameter than the housing 26 and which extend inwardly beyond the inner end of the housing and embrace a reduced extension 28 on the hub 17 of the fly wheel, there being a shoulder 28a between the housing 26 and the arms 27.

The outer end of the housing 26 is provided with an inwardly projecting flange 29 having a circular aperture 30 therethrough of smaller diameter than the maximum diameter of the gear 20 and of greater diameter than the minimum diameter of the gear 20. Since the diameter of the aperture is smaller than the out side diameter of the gear 20, a plurality of notches 31 are cut into the periphery of the circular aperture, the number and positioning of the notches corresponding to the number and positioning of the teeth of the gear, to enable the housing 26 to be put in place over the gear.

An annular disc 32 having an outer diameter approximately equal to the inner diameter of the main portion of the housing is interposed between the inner end of the hub 21 and the reduced portion 28 of the hub 17 to prevent the spring 24 from catching in a rounded corner 33 in the housing 26, since if the spring should catch under such a corner it would bind and prevent the proper operation of the clutch mechanism. The housing 26 is held assembled by a pair of lugs 34 which are fastened to the reduced portion 28 of the hub 17 and to the shaft 18, through a bolt 35. The lugs 34 have arcuate inner surfaces 36 which fit on the outer periphery of the reduced hub 28 and are provided with annular projections 37 having fingers 38 overlying the shoulder 28a on the housing 26 to retain the housing assembled with the fly wheel structure.

The drive between the housing 26 and the fly wheel 17 is accomplished by shoulders 40 against which edges 41 of arms 27 abut to transmit motion.

A resilient lost motion device is provided by a spring 42 which is attached at one end to an outstanding finger 43 on the lug 34 and at the other end to an outstruck finger 44 on the housing 26. The purpose of the lost motion device will be described below.

The gear 20 is driven through a segment gear 45 mounted on an arm 46 through a plurality of rivets or other permanent fastening means 47. The arm 46 is pivoted to the circular wall 13 on an axis 48 and has an arm 49 projecting beyond the axis which may be actuated by either hand or foot.

A stop 50 is mounted on the wall 13 and limits the downward movement of the segment gear, the segment gear 45 being constantly urged against the stop 50 by a coil spring 51. The spring 51 is attached to the gear 45 through an outstanding pin 52 and has its other end connected to the wall 13 through a pin 52a.

It will be noted that the segment gear 45 is constantly out of mesh with the pinion 20. Means must, therefore, be provided to insure proper meshing of the gear 45 with the gear 20. This is accomplished through a resilient tooth 53 which is formed of a leaf spring pivotally mounted at 54 to the segment gear. The resilient tooth 53 is permitted a maximum amount of resiliency in an outward direction by a stop 55 mounted on the gear 45 adjacent the pivot 54 and is restrained from movement in an inward direction by a second stop 56 mounted on the gear 45 on the opposite side of the spring 53 from the stop 55.

In normal operation, if the gear 20 is in position so that the gear 45 would mesh with it upon being actuated, the tooth 53 will mesh with the gear 20, turning the gear against the action of the spring 42 so that the next tooth of the gear 45 will mesh with the gear 20. However, if the gear 20 is not in such a position, the resilient tooth 53 will spring back as shown in Fig. 2, and slide over the top of the interfering tooth in the gear 20, mesh between that tooth and the next preceding tooth and turn the gear over sufficiently so that the first tooth of the gear 45 meshes with the gear 20. The arrangement of the spring 42 is such as to permit the turning over of the gear 20 through one full tooth without turning the engine.

*Operation*

To start the engine, the foot pedal 49 is pressed downwardly. This causes the resilient tooth 53 to engage between the teeth of the gear 20. If the teeth of the gear 20 are not positioned for the tooth 53 to mesh between them, then the tooth 53 will yield in the manner described above to engage ahead of the tooth on which it strikes and turn the gear 20 sufficiently for the first tooth of the gear 45 to mesh accurately between the teeth. The spring 42 allows the gear 20 to turn sufficiently so that the resilient tooth 53 is never put under the full starting stress since before the engine starts to turn over, the first tooth of the gear 45 must be engaged with the gear 20.

When all of the play has been taken up in the spring 42, the shoulder 41 abuts the edge of the lug 34 to start driving the engine. At this point, the first tooth of the gear 45 is engaged with the gear 20. Further depression of the pedal 49 then starts the engine.

When the engine turns over under its own power, the spring 24 loses its effectiveness due to an uncoiling action within the housing 26 as described above and permits the gear 20 to be turned backwards against the action of the engine to allow the starter 15 to come to rest in its original position. After the gear 45 has disengaged from the gear 20, there is probably sufficient tension in the spring 24 to drive the gear. However, this tension is not sufficient to injure the teeth of the gear 45 in case that gear should be accidentally engaged with the gear 20 while the engine is running.

Having thus described the invention, it is realized that it is susceptible to various changes and modifications coming well within the scope of one skilled in the art and it is not, therefore, desired to limit the invention to the precise form herein shown and described, but only by the scope of the appended claims.

What is claimed as new and desired to secure by Letters Patent is:

1. A clutch device through which a rotatable shaft may be driven comprising a pinion having a hub freely rotatably mounted on the outer end portion of the shaft and held against inward movement by an enlargement on the shaft, a cylindrical cup engaged over the hub with a part overlying the enlargement on the shaft, means engaging said part of the cup to secure the cup to the shaft, an instruck abutment on the outer end of the cup, and an overrunning clutch element having a connection with the hub of the pinion and engaging said instruck abutment on the outer end of the cup to hold the pinion and hub against detachment from the shaft and to afford a driving connection between the pinion and cup upon rotation of the pinion in one direction.

2. A clutch device through which a rotatable shaft may be driven comprising, a pinion having a hub loosely mounted on the end portion of the shaft and held against inward movement by an enlargement on the shaft, a cylindrical cup engaged over the hub of the pinion with the pinion protruding through the bottom of the cup, means on the open end of the cup overlying the enlargement on the shaft, and a connection between said means and the shaft whereby the cup is secured to the shaft, a coiled spring wound within the cylindrical cup and over the hub of the pinion with one end engaging the hub, said coiled spring tending to expand and frictionally engage the inner wall of the cup, whereby rotation of the pinion in a direction tending to unwind the spring through its connection with the hub of the pinion causes the spring to securely grip the inner wall of the cup and transmit motion thereto, said connection between the hub and the spring also preventing relative endwise motion therebetween, and the bottom of the cup engaging the adjacent end of the spring to retain it and the pinion on the shaft.

3. A clutch device through which a rotatable shaft may be driven comprising, a driving member including a pinion loosely mounted on the shaft, a hub on said pinion, a cup shaped housing mounted on said hub with the pinion protruding through the bottom of the cup, an overriding clutch element mounted between the hub and the housing and adapted to drive the housing from the hub when said pinion is turned in one direction and to permit the pinion to turn in the opposite direction without imparting rotation to the housing, circumferentially spaced extensions on the open end of the cup shaped housing overlying a part fixed on the shaft, a lug carried by said part to be movable with the shaft and disposed between said extensions to form a jaw clutch connection therewith for transmitting rotation from the cup shaped housing to the shaft, said lug being of less width than the space between the extensions whereby said jaw clutch connection has a degree of lost motion, and a spring connecting the lug with one of said extensions to take up the lost motion in a direction so that the spring takes up the shock of the initial movement imparted to the cup shaped housing from the pinion.

JOHN W. FITZ GERALD.